(12) United States Patent
Martin et al.

(10) Patent No.: US 6,271,785 B1
(45) Date of Patent: Aug. 7, 2001

(54) CMOS IMAGER WITH AN A/D PER PIXEL CONVERTOR

(75) Inventors: David Andrew Martin, Atlantic Highlands; Krishnaswamy Nagaraj, Somerville, both of NJ (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/292,183

(22) Filed: Apr. 15, 1999

Related U.S. Application Data
(60) Provisional application No. 60/083,477, filed on Apr. 29, 1998.

(51) Int. Cl.$^7$ .................................................... H03M 1/56
(52) U.S. Cl. .......................................... 341/169; 341/155
(58) Field of Search .................................. 341/169, 155, 341/140

(56) References Cited

U.S. PATENT DOCUMENTS

| | | | |
|---|---|---|---|
| 4,155,037 | * 5/1979 | Mazur | 341/169 |
| 4,257,034 | * 3/1981 | Wilkinson | 341/169 |
| 4,266,274 | * 5/1981 | Barman | 341/169 |
| 5,408,324 | * 4/1995 | Sato et al. | 356/376 |
| 5,461,425 | * 10/1995 | Fowler et al. | 348/294 |
| 5,530,242 | * 6/1996 | Genovese | 250/234 |
| 5,565,915 | 10/1996 | Kindo et al. . | |
| 5,699,278 | 12/1997 | Brajovic . | |
| 5,801,657 | 9/1998 | Fowler et al. | 341/155 |
| 5,920,274 | * 7/1999 | Gowda et al. | 314/155 |
| 5,963,044 | * 10/1999 | Schaefer | 341/169 |
| 6,137,432 | * 10/2000 | Xiao | 341/169 |

FOREIGN PATENT DOCUMENTS

| | | |
|---|---|---|
| 0 749 234 A | 12/1996 | (EP) . |
| 0 793 380 A | 9/1997 | (EP) . |

OTHER PUBLICATIONS

Ludwig, David E., et al.; *On–Focal Plane Analog–to–Digital Conversion With Detector Gain and Offset Compensation,* Proc. Of SPIE, vol. 1097, Materials, Devices, Techniques, and Applications for Z–Plane Focal Plane Array (FPA) Technology, Mar. 29, 1989, Bellingham, VA, pp. 73–84, Fig. 6.

* cited by examiner

*Primary Examiner*—Peguy Jeanpierre
*Assistant Examiner*—Jean Bruner Jeanglaude
(74) *Attorney, Agent, or Firm*—Robert D. Marshall, Jr.; W. James Brady, III; Frederick J. Telecky, Jr.

(57) ABSTRACT

An image sensor (10) which can be fabricated using conventional CMOS processes uses a comparator circuit (18) at each pixel (14) having a first input coupled to a photodetector (16) and a second input coupled to a ramp signal generator (30, 32). The ramp signal generator (30, 32) is comprised of a counter (32) and a D/A conversion circuit (30) with the analog output of the D/A conversion circuit (30) forming an analog ramp input to the comparator circuit (18). A counter circuit (32) can be used to drive the digital side of the D/A conversion circuit (30) and configured to count from 0 to $2^n-1$ to 0, N being the resolution of the photodetector (16). The output of the D/A conversion circuit (30) causes comparator circuit (18) to flip when the ramp signal is equal to the value of the output from the photodetector (16). The comparator circuit (18), in turn, drives a load signal to a register (38) which stores the counter values 32 from pixel (14) at the instant the comparator 18 flips. In this way an A/D conversion of the image data takes place.

1 Claim, 4 Drawing Sheets

CMOS IMAGER WITH AN A/D PER PIXEL CONVERTOR

This application claims priority under 35 USC §119(e)(1) of Provisional Application No. 60/083,477, filed Apr. 29, 1998.

TECHNICAL FIELD

The present invention relates in general to an image signal processing system and more specifically to an image sensor circuit and related method of converting image signals from their analog to digital equivalent by placing a comparator circuit at each pixel in the image sensor array.

BACKGROUND OF THE INVENTION

Solid state imaging systems have been in use for a number of years in high-tech devices such as medical instruments, satellites and telescopes. More recently, imagers have been employed in a wide array of mainstream applications such as digital cameras, camcorders and scanners. Most of these applications use Charge-Coupled Devices ("CCD") to build the underlying solid state image sensors.

For various reasons, CCD-based image sensors are limited or impractical for use in many consumer applications. First, CCDs require at least two polysilicon layers with a buried-channel implant to-achieve their high performance, meaning that they cannot be fabricated using standard CMOS fabrication processes. Second, the level of integration that can be achieved with CCD-based imagers is low since they can not include the devices necessary to integrate them with other devices in the application. Finally, the circuits used to transfer data out of the image array to other devices on the system board, such as Digital Signal Processors ("DSPs") and other image processing circuits, have a large capacitance and require voltages higher than the other circuits. Since the currents associated with charging and discharging these capacitors are usually significant, a CCD imager is not particularly well suited for portable or battery operated applications.

As such, less expensive image sensors fabricated out of an integrated circuits using standard CMOS processes are desirable. Essentially, with a CMOS type imager sensor, a photo diode, photo transistor or other similar device is employed as a light detecting element. The output of the light detecting element is an analog signal whose magnitude is approximately proportional to the amount of light received by the element. CMOS imagers are preferred in some applications since they use less power, have lower fabrication costs and offer higher system integration compared to imagers made with CCD processes. Moreover, CMOS imagers have the added advantages that they can be manufactured using processes similar to those commonly used to manufacture logic transistors.

An important signal processing circuit is the analog to digital convertor ("ADC"). In the last few years, CMOS imagers have been developed with the ADC on the imager itself. The optimal place for the ADC is immediately after the photosensor, i.e., on the pixel itself. An example of a prior CMOS image sensor is described in the article entitled "A 128 by 128 Pixel CMOS Area Image Sensor With Multiplex Pixel Line A/D Conversion", IEEE 1996 Custom Integrated Circuits Conference, Yang, David X. D., Fowler, Boyd, Gamal, ELAbbas. In their article, the authors describe an image sensor consisting of an array of pixel blocks wherein each block further consists of a group of four nearest neighbor pixels sharing a single Analog to Digital ("A/D") convertor.

A limitation inherent to such sensors is the use of oversampling A/D conversion methods which require a clock rate well above the image frame rate. The need to keep the conversion rate high in such image sensors requires a substantial amount of drive current making the sensor impractical for many mainstream applications including battery powered or portable devices.

Another problem common to prior art CMOS image sensors is the amount of fixed pattern noise due to beta variations from pixel to pixel which can often be seen with the naked eye. Other undesirable features of prior art CMOS image sensors include large comparator offsets, high complexity of the A/D conversion circuitry, high power dissipation and the inability to achieve a non-linear response for certain applications.

SUMMARY OF THE INVENTION

In accordance with the present invention, the disadvatages and problems associated with the prior CMOS image sensors are substantially reduced or eliminated.

According to one embodiment, disclosed is an image sensor which can be fabricated using a conventional CMOS process. A comparator circuit is placed at each pixel having a first input connected to a photodiode, photo transistor or other similar light detecting element, and a second input connected to a ramp signal generator. Since the comparator circuits are relatively simple devices, they are small enough to be fabricated within individual pixel cells and are effective at eliminating the noise associated with prior art conversion techniques.

In one embodiment, the ramp signal generator comprises a Digital to Analog Conversion "DAC" circuit that drives one input of the comparator circuit. A counter can be coupled to the digital side of the DAC circuit and configured to count from $2^{N-1}$ to 0, N representing the resolution of the light detecting element.

In one embodiment, the pixels are arranged in a two-dimensional array of columns and rows. For each row of pixels, the counter drives the DAC circuit which, in turn, outputs an analog signal proportional to the value received from the counter. A converter and register are connected so that the output of the counter drive the register, and the load signal of the register is connected to the output of the comparator circuit. The output of the DAC circuit is fed to the comparator circuit which flips when the ramp signal equals the value of the light detecting element. The counter value loaded into the register at the time the comparator flips is the digital representation of the analog output of the light detecting element.

In another embodiment, the ramp signal can be generated by other means, such as a capacitor fed by a constant current source, the output of the capacitor being followed by a unity gain voltage buffer whose output is the ramp signal.

In another embodiment, when a nonlinear response is desired, a programmable memory means such as ROM, EEPROM, or RAM may be employed to store values corresponding to the desired response curve. The values may be loaded into the DAC circuit and converterd as herein described to obtain a non-linear response.

According to another embodiment, each comparator circuit is reset to eliminate variations in comparator offsets by resetting the pixels to their settling or zero light value prior to the analog digital conversion sequence.

According to another embodiment, a single D/A conversion circuit is associated with the entire pixel array which may consist of N by M pixels. The D/A conversion circuit drives only a single row at a time with the corresponding comparator circuit in that row driving the associated register loads at one time.

Other advantages of the present invention, including specific implementations, are understood by reference to the following detailed description taken in conjunction with the appended drawings.

BRIEF DESCRIPTION OF THE DRAWINGS

In the drawings.

Numerals in the figures refer to corresponding parts in the description unless otherwise indicated.

DETAILED DESCRIPTION OF THE PREFERRED EMBODIMENTS

Figure 1:
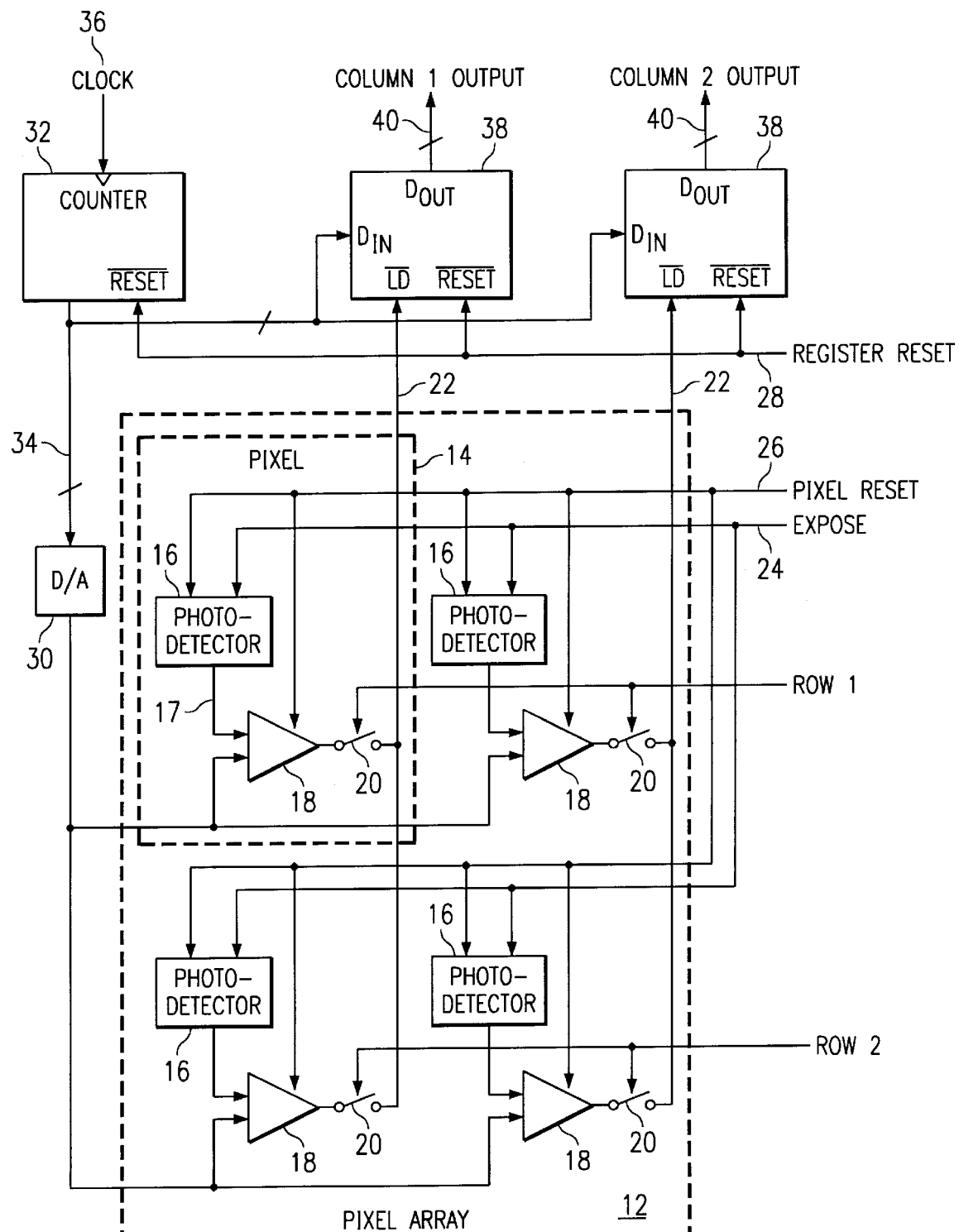
FIG. 1 is a block diagram of a CMOS A/D per pixel imager for a 2×2 array according to one embodiment.

FIG. 1 is a block diagram of the CMOS A/D per pixel imager 10 according to a preferred embodiment of the invention. As shown, a pixel array 12 comprises a plurality of pixels 14 arranged in a two-dimensional array of columns and rows. Within each of the individual pixels 14, a photodetector 16 is predisposed to receive light when exposed to a light emitting source. The photodetector 16 can be a photo-diode, photo-transistor or other similar device as is known to those of ordinary skill.

The output from the photodetector 16 is a first input to the comparator circuit 18. A second input into the comparator circuit 18 comes from the Digital to Analog ("D/A") conversion circuit 30 whose output on the comparator circuit side is an analog signal. As shown, a counter circuit 32 is coupled to the D/A conversion circuit 30 through the bus 34. Preferably, the width of bus 34 is n bits corresponding to the resolution of the photodetector 16. A clock signal 36 is applied to the counter 32 which determines the counting rate of the counter 32. The output from the counter 32, in turn, drives the D/A conversion circuit 30 which controls the magnitude and rate of change of the analog signal output from the D/A conversion circuit 30. The speed of clock signal 36 determines the slope of the analog signal.

For each pixel 14, a comparator circuit 18 is attached to both the photodetector 16 and the D/A conversion circuit 30 as shown. In one embodiment, the output of the D/A conversion circuit 30 is a ramp signal that reaches the value of the output of the photodetector 16 at some point in time.

The output of each comparator circuit 18 acts as a load signal for registers 38 through switch 20. The registers 38 load the value of the counter circuit 32 at the moment that the output of the D/A conversion circuit 30 equals or exceeds the output of the photodetector 16. At this time, a conversion of the analog signal from the photodetector 16 is converted to its digital equivalent as represented by the count of counter 32 on signal 34. This is done for all pixels 14 in columns 1 through N in a rom M at the same time in parallel. The conversion is done for each row sequentially, preferably for all pixels for 14 in columns 1 through N in a row M at the same time in parallel. Thus the conversion is done for each row sequentially.

Preferably, the D/A conversion circuit 30 drives only one row of pixels within the array 12 at a time. It should be understood, however, that more or less pixels within the array 12 may be read during a given cycle and that the reading sequences may vary. Thus, a single pixel or the entire image may be read during a single cycle according to various embodiments.

As shown, a pixel RESET signal 26 is coupled to each of the photodetectors 16 within the array 12. Pixel RESET 26 provides a way of canceling offsets to limit the differences, or offsets, among individual comparator circuits 18 and photodetectors 16 within the pixel array 12. The offsets in the comparator circuits 18 are canceled and photodetects 16 by pixel RESET 26 greatly reduce or even eliminate the fixed pattern noise associated with pixel cells 14. Preferably, the pixel RESET 26 places the pixels 14 in the array 12 at their settling or zero light value prior to activation of the D/A conversion circuit 30. While this technique permits each comparator 18 within individual pixels 14 to be adjusted to compensate for offsets in both 16 and 18, it should be understood that additional methods of fixed pattern noise cancellation may be utilized.

Figure 2:
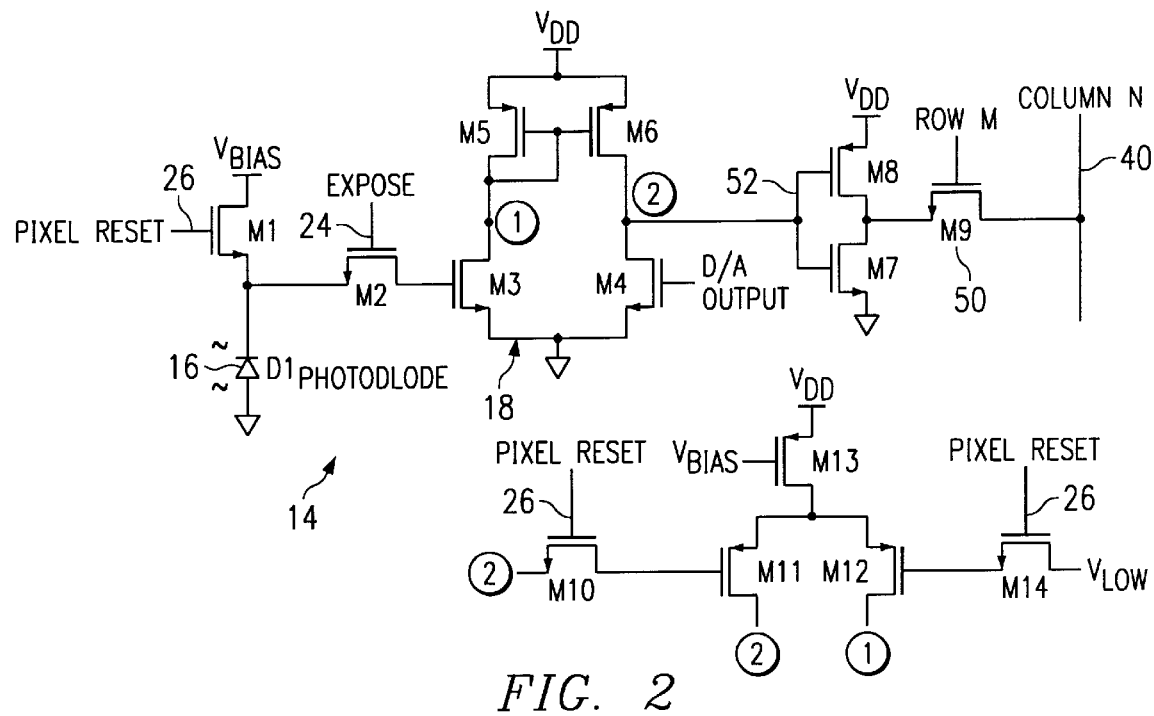
FIG. 2 is a schematic diagram of a circuit for single pixel at row M column N.

Turning next to FIG. 2, a schematic diagram for an individual pixel 14 of the pixel array 12 is shown having two voltage bias inputs $V_{bias}$ and $V_{low}$. The bias voltages ($V_{bias}$, $V_{low}$) are the same for every pixel. Preferably, $V_{low}$ is the minimum expected voltage output achievable by an individual comparator circuit 18. $V_{bias}$, on the other hand, should be one CMOS threshold voltage below the supply rail $V_{dd}$.

As shown, a photo-diode 16 is used as the photodetecting element. The EXPOSE signal 24 connects the photo-diode 16 to comparator 18 through transistor M2. Preferably, a pixel RESET 26 is asserted prior to the EXPOSE signal 24. As shown, a pair of complementary NMOS transistors (M3, M4) may be used in the comparator circuits 18 to receive the outputs from the photo-diode 16 and D/A conversion circuit 30.

For D/A output signals greater than the output from the photo-diode 16, the output at row M column N is a logical zero. As a D/A output is decreased to a value equal to the photo-diode output, the inverter formed by transistors M7 and M8 is flipped.

While the row signal is an NMOS passgate 50 which can easily pull the pixel output LOW, it is not sufficient for pulling it HIGH. As such and according to one embodiment, every column output 40 is pre-charged high by the corresponding register 38 and then pulled low when the comparator 18 flips.

Figure 3:
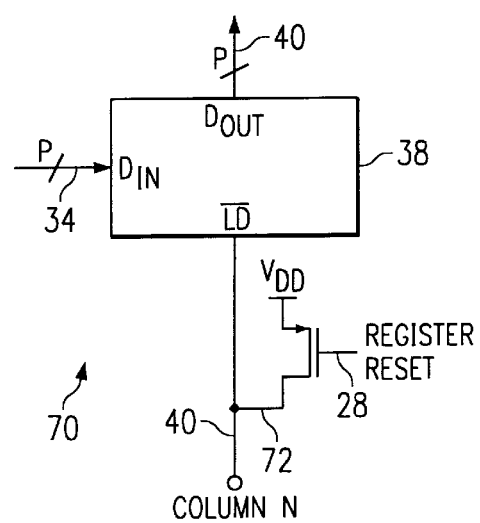
FIG. 3 is a block diagram for the registor load signal pre-charge circuit.

An example of a register load signal pre-charge circuit suitable for this purpose is shown in FIG. 3 and denoted generally as 70. An individual register 38 is pre-charged using the pull-up transistor 72 to bring the column line output 40 HIGH prior to flipping of the comparator circuit 18. This permits the pixel 14 to pull the column line 40 LOW at the appropriate time as determined by the row select switches 20 and the clock cycle 36 of the counter circuit 32. Preferably, all pixels 14 in a row are read at the same time by loading the outputs from the corresponding comparators 18 into the registers 38 during a single cycle. In one embodiment, row select signals (Row1, Row2) are provided to activate the read sequence after RESET. Other methods of reading the pixel outputs can be devised within the scope of the invention.

Register 38 can be designed to loads $D_{IN}$ on the rising edge of LD. If so, once LD is HIGH, it will not load new data until LD goes LOW and then goes HIGH again.

Figure 4:
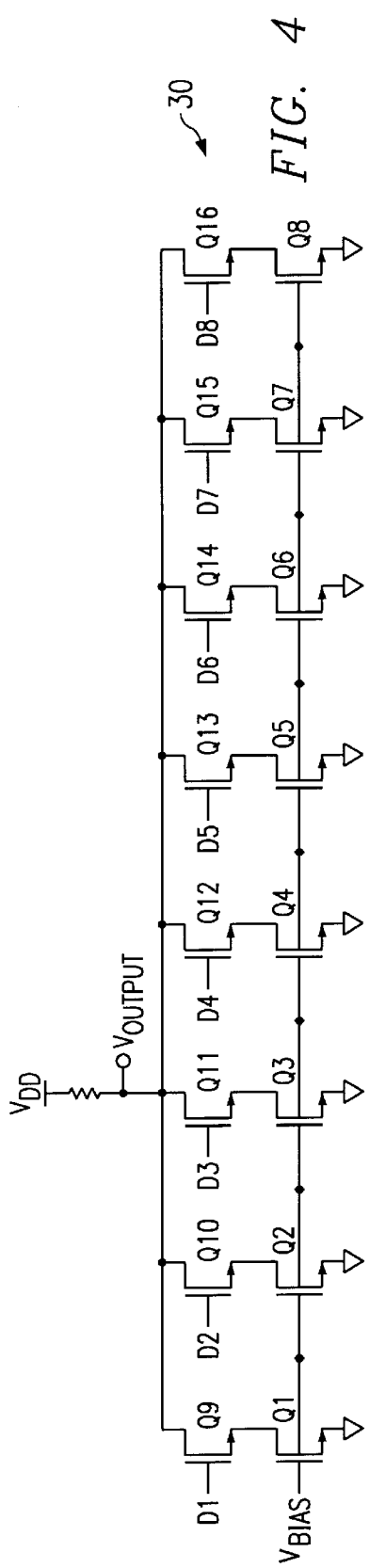
FIG. 4 is a block diagram of a sample D/A conversion circuit with output weighting for each bit D1:D8.

FIG. 4 is a circuit diagram for a suitable D/A convertor circuit 30 for use in an image sensor according to one embodiment. The D/A convertor circuit 30 must be monotonic with a continuously decreasing output. The output of the D/A convertor circuit 30 is dependent on the digital bit stream sequence D1:D8 delivered by the counter circuit 32. The output of the D/A convertor circuit 30 can be non-linear, as long as it is still monotonic, if the bit stream D1:D8 is other than step-wise linear.

In one embodiment, the counter circuit 32 comprises a programmable memory means such as a ROM, RAM, or EEPROM device which drive the waveform output from the transistors Q1 through Q8 to be linear, non-linear or other desired shape. Transistors Q1 through Q8 can be weighted to give the desired output for each bit in the bit input stream sequence D1:D8. It should be understood, however, that the D/A conversion circuit 30 of FIG. 4 is but one example of a signal generator suitable for driving pixels 14. For example, a ramp signal generator could be used instead of the D/A conversion circuit 30 to provide step output that drives the pixels 14 in the array 12. Other methods may be utilized as will be apparent to those of ordinary skill.

Figure 5:
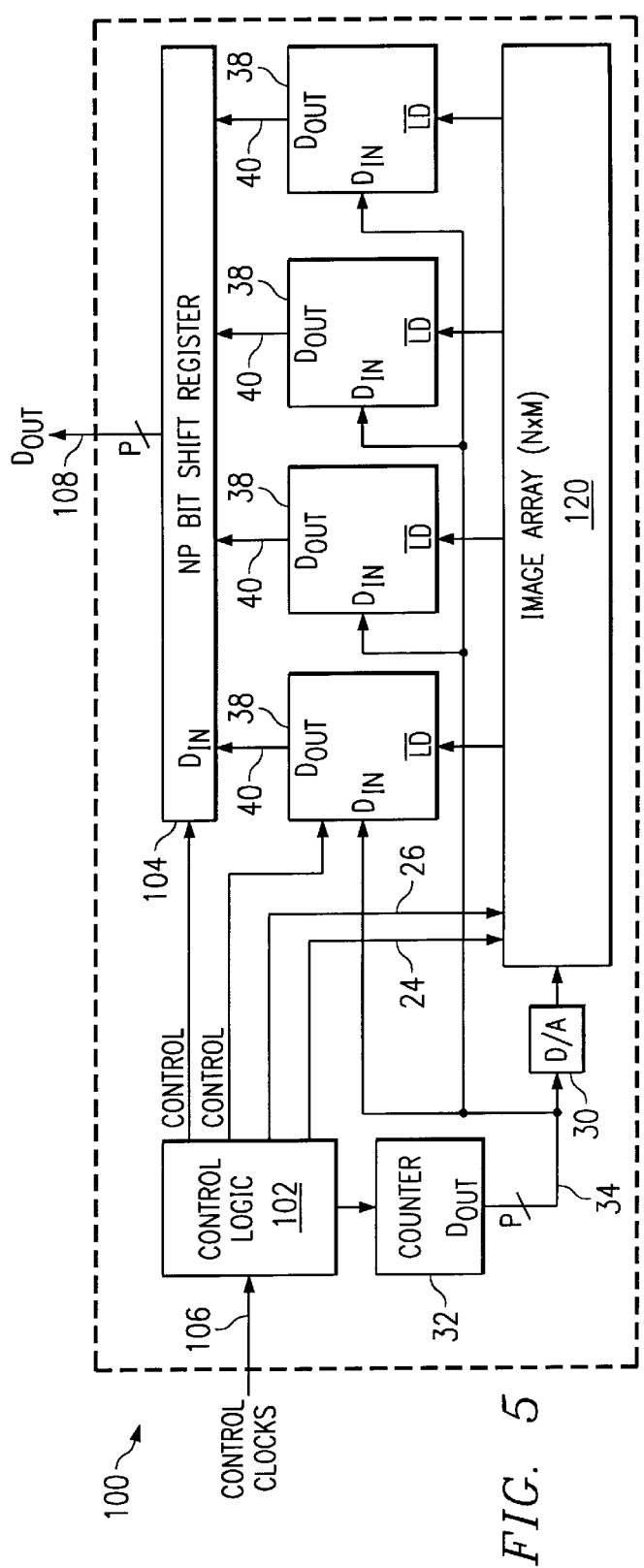
FIG. 5 is a chip-level block diagram of a per pixel imager according to one embodiment.

Turning to FIG. 5, an integrated circuit chip CMOS imaging sensor according to one embodiment is shown and denoted generally as 100. The N×M image array 120 of the chip 100 consist of M rows and N columns of pixels 14 configured as described above in FIG. 1 with respect to pixel array 12. For the example shown in FIG. 5, a 4×M imager chip is illustrated with 4 registers 38 being driven by the image array 120. M can be equal to N, but this is not necessary.

The imager chip 100 incorporates the control logic 102 and shift register 104 which comprise the input/output interface for the imager chip 100 and allow external control of the chip 100 and general communications with external processing systems via the control/clock line 106 and data out line 108, respectively. As the registers 38 are loaded with pixel array data from the image array 120, individual image bits are passed to the NP bit shift register 104 where N represents the number of columns and P represents the number of bits in the output sequence from the counter 32. The NP bit shift register 104 allows the imager chip 100 to deliver the image data to an outside system using output bus 108, while the next row of image data is being read out of the image array 120.

As shown, the control logic 102 receives control signals 106 which operate the imager chip 100 including the counter circuit 32, the NP bit shift register 104 and registers 38. In one embodiment, the control lines 106 consist of a clock, RESET and EXPOSE signals. The control lines 106 are used to operate various features of the chip 100 including the cancellation of offsets, the EXPOSE time cycle of the image array 120, and the frequency rate of the clock. It should be understood, however, that various other functions of the imager chip 100 may be controlled via the control lines 106 depending on the application in which the chip 100 is used.

The control logic 102 is shown coupled to the NP bit shift register 104 and the registers 38 to control the shifting of data to the outside world via bus 106. Preferably, the outputs from all pixels in the image array 120 are switching so that the D/A convertor 30 drives only one row of pixels at a time and thus, only one comparator circuit 18 within a column will drive a register load signal 22 at a time. The reading sequence for pixels in the array 120 can vary depending on how the outputs from the individual pixel cells 14 are loaded into the registers 38.

Figure 6:
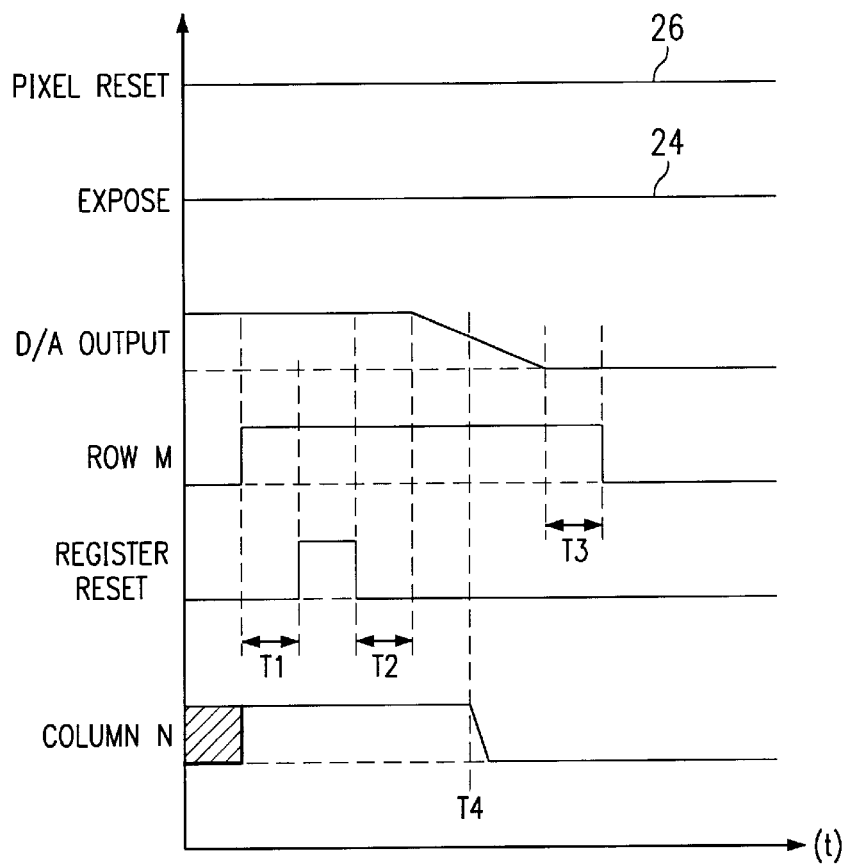
FIG. 6 is a timing diagram for the pixel readout sequence corresponding to a single row within the imager.

FIG. 6 is a timing diagram for the pixel readout sequence of an arbitrary pixel in the array 120 at column N and row M. As shown, the RESET line 26 and EXPOSE line 24 stay LOW the entire time. The output from the D/A convertor circuit 30 is the only analog signal in the system, as all other signals including row M, register RESET and column N are digital.

Column N is the output of the pixel in column N and row M and is set HIGH by the register RESET 26. Assuming the counter circuit 32 counts from its maximum value down to 0, the D/A output goes from its highest value to its lowest value. The column N goes LOW when the D/A output equals the voltage stored on the gate M3, as shown in FIG. 2. This permits the pixels 14 along row M to drive the corresponding register load signal 22 at time T4.

Figure 7:
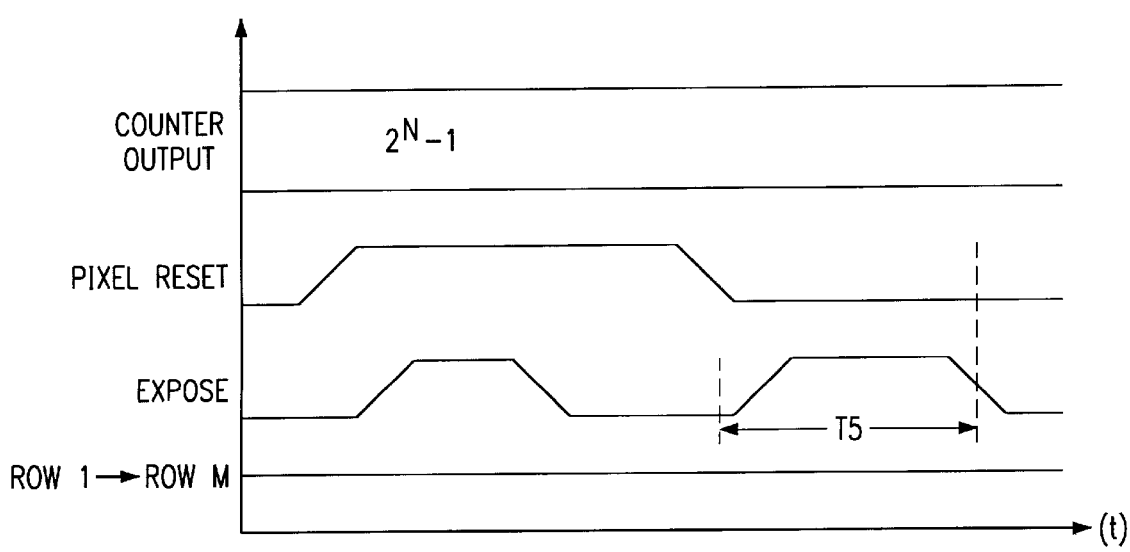
FIG. 7 is a timing diagram for the RESET and EXPOSE signal sequences.

A timing diagram for the RESET and EXPOSE signal sequences is shown in FIG. 7. In contrast to the signal sequence of FIG. 6, the signals row 1 through row M stay LOW the entire time while the counter output ($2^N-1$) remains at its maximum value throughout. As indicated, the only critical times are T4 and T5. For T4, with the signal pixel RESET going LOW before the EXPOSE signal goes HIGH. Likewise, the EXPOSE signal goes HIGH as soon as possible after the pixel RESET goes LOW. T5 is the expose cycle time of the image array 120. In one embodiment, the time T5 can be adjusted according to light level of the image to be captured. Thus, the brighter the light, the shorter the exposure time.

While the invention has been described in conjunction with preferred embodiments, it should be understood that modifications will become apparent to those of ordinary skill in the art and that such modifications are intended to be included within the scope of the invention and the following claims.

What is claimed is:

1. An image sensor comprising:

a ramp signal generator;

a counter circuit counting from an initial count to a final count in synchronism with said ramp signal generator;

a plurality of pixel cells disposed in a two-dimensional array of M rows and N columns, each of the cells containing a photodetector and a comparator circuit, each comparator circuit having first and second input terminals, each photodetector having an output terminal driving a first input of a comparator circuit, the plurality of pixel cells coupled to the ramp signal generator so that analog signals from the ramp signal generator drive a second input of a comparator circuit, each comparator circuit delivering an output when the analog signals from the ramp signal generator are equal to an output from a photodetector;

a plurality of M row select lines, each row select line coupled to said comparator of pixel cells of one of said M rows, one of said row select lines activated sequentially to enable said comparators of said corresponding one of said M rows;

a plurality of N registers, each register having a data input receiving a count from said counter circuit and an enable input connected to said output terminals of comparators of pixels cells in one of said N columns, each register storing said count of said counter circuit upon receipt of said output of a corresponding comparator.

* * * * *